United States Patent
Yokota et al.

(10) Patent No.: US 10,518,701 B2
(45) Date of Patent: Dec. 31, 2019

(54) IMAGE MONITORING APPARATUS, MOVABLE OBJECT, PROGRAM AND FAILURE DETERMINING METHOD

(71) Applicant: KYOCERA CORPORATION, Kyoto (JP)

(72) Inventors: Tadashi Yokota, Yamato (JP); Haruo Yanagisawa, Anjyo (JP); Takatoshi Nakata, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 185 days.

(21) Appl. No.: 14/411,935

(22) PCT Filed: Jul. 26, 2013

(86) PCT No.: PCT/JP2013/004563
§ 371 (c)(1),
(2) Date: Dec. 30, 2014

(87) PCT Pub. No.: WO2014/017105
PCT Pub. Date: Jan. 30, 2014

(65) Prior Publication Data
US 2015/0165974 A1 Jun. 18, 2015

(30) Foreign Application Priority Data
Jul. 26, 2012 (JP) ................. 2012-166257

(51) Int. Cl.
*H04N 17/00* (2006.01)
*H04N 7/18* (2006.01)
*B60R 1/00* (2006.01)

(52) U.S. Cl.
CPC ............... *B60R 1/00* (2013.01); *H04N 7/18* (2013.01); *H04N 17/002* (2013.01);
(Continued)

(58) Field of Classification Search
CPC ... B60R 1/00; B60R 2300/10; B60R 2300/30; B60R 2300/304; H04N 17/002; H04N 7/18
(Continued)

(56) References Cited

U.S. PATENT DOCUMENTS 5,343,244 A 8/1994 Sase et al.
7,259,786 B2 * 8/2007 Shimizu ............. H04N 1/00413
348/231.6
(Continued)

FOREIGN PATENT DOCUMENTS

DE 100 06 091 A 8/2000
EP 2147844 A2 * 1/2010 .......... B61L 15/0027
(Continued)

OTHER PUBLICATIONS

International Search Report; PCT/JP2013/004563; dated Sep. 3, 2013.
(Continued)

*Primary Examiner* — Sath V Perungavoor
*Assistant Examiner* — Yong Joon Kwon
(74) *Attorney, Agent, or Firm* — Studebaker & Brackett PC

(57) ABSTRACT

The image monitoring apparatus (10) has an image acquiring unit (15), an image processing unit (16) and a determining unit (17). The image acquiring unit (15) continuously acquires a peripheral image. The image acquiring unit (15) superimposes a periodically changing signal on a predetermined position of the peripheral image. The image processing unit (16) treats the peripheral image superimposed with the signal with a predetermined image processing. The determining unit (17) determines a failure of the image processing unit based on a presence or absence of a periodic
(Continued)

change in the superimposed signal on the peripheral image treated with the predetermined image processing.

17 Claims, 5 Drawing Sheets

(52) U.S. Cl.
CPC ....... *B60R 2300/10* (2013.01); *B60R 2300/30* (2013.01); *B60R 2300/304* (2013.01)

(58) Field of Classification Search
USPC ........................................................ 348/148
See application file for complete search history.

(56) References Cited

U.S. PATENT DOCUMENTS

| | | | | |
|---|---|---|---|---|
| 7,551,841 B2* | 6/2009 | Saito | ................. | H04N 5/23293 369/30.01 |
| 9,117,123 B2* | 8/2015 | Nix | .................... | G06K 9/00845 |
| 2008/0204563 A1* | 8/2008 | Grindheim | .............. | G09G 5/00 348/208.14 |
| 2012/0178992 A1* | 7/2012 | Fujimoto | ........... | A61B 1/00006 600/109 |
| 2013/0088596 A1* | 4/2013 | Raita | ........................ | B60R 1/00 348/148 |

FOREIGN PATENT DOCUMENTS

| | | | | |
|---|---|---|---|---|
| JP | 2007-022360 A | | 2/2007 | |
| JP | 2007022360 A | * | 2/2007 | |
| JP | 2008283431 A | | 11/2008 | |
| JP | 2011-188134 A | | 9/2011 | |
| JP | 2011188134 A | * | 9/2011 | ............... B60R 1/00 |
| JP | 2011-234296 A | | 11/2011 | |
| JP | 2011234296 A | * | 11/2011 | |

OTHER PUBLICATIONS

Written Opinion of the International Searching Authority; PCT/JP2013/004563; dated Sep. 3, 2013; with concise explanation.
The extended European search report issued by the European Patent Office dated Mar. 15, 2016, which corresponds to European Patent Application No. 13822239.3-1902 and is related to U.S. Appl. No. 14/411,935.
Communication pursuant to Article 94(3) EPC issued by the European Patent Office dated Mar. 14, 2018, which corresponds to European Patent Application No. 13 822 239.3-1208 and is related to U.S. Appl. No. 14/411,935.
JP Office Action dated Oct. 17, 2017, from corresponding JP Appl No. 2014-526779, with English statement of relevance, 6 pp.
"Digital Image Forensics: There is More to a Picture than Meets the Eye"; https://books.google.com/books?id=PzP9ViF8oAIC&pg=PA36 &dq=%22optical+black%22+image+sensor&hl=en&sa=X&ved= 0ahUKEwj_9a3ds5LZAhUBRmMKHbaODToQ6AEIODAD#v= onepage&q=%22optical%20black%22%20image%20sensor&f= false (2013).
"Image Sensors and Signal Processing for Digital Still Cameras"; https://books.google.com/books?id=UY6QzgzgieYC&pg=PA87 &dq=%22optical+black%22+image+sensor&hl=en&sa=X&ved= 0ahUKEwj_9a3ds5LZAhUBRmMKHbaODToQ6AEIKTAA#v= onepage&q=%22optical%20black%22%20image%20sensor&f= false (2005).
An Office Action issued by the European Patent Office dated Jan. 10, 2017, which corresponds to European Patent Application No. 13 822 239.3-1902; 5pp.

* cited by examiner

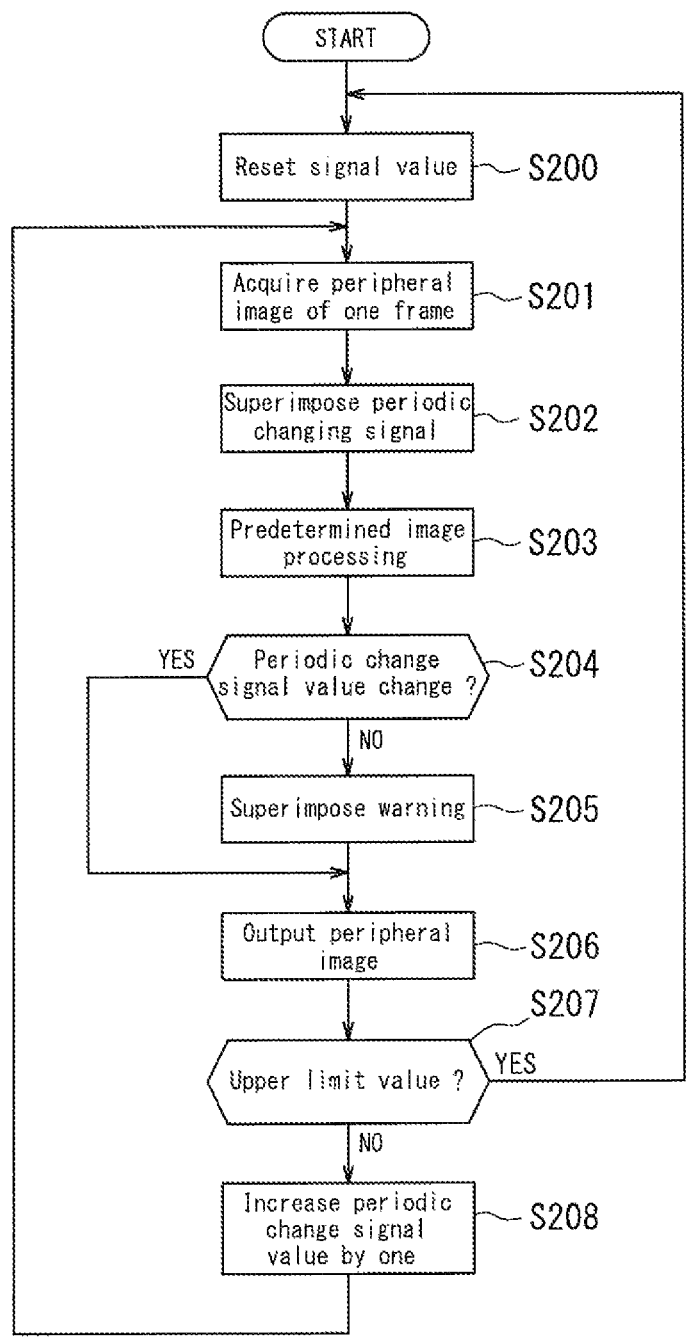

IMAGE MONITORING APPARATUS, MOVABLE OBJECT, PROGRAM AND FAILURE DETERMINING METHOD

CROSS-REFERENCE TO RELATED APPLICATION

This application claims priority to and the benefit of Japanese Patent Application No. 2012-166257 filed on Jul. 26, 2012, the entire contents of which are incorporated herein by reference.

TECHNICAL FIELD

The present invention relates to an image monitoring apparatus that determines a failure based on a photographed peripheral image, a movable object, a program and a failure determining method.

BACKGROUND

An image monitoring apparatus provided on a movable object such as a vehicle is known. An image monitoring apparatus is mounted such that a peripheral image in a dead angle area of the driver's seat of vehicle is displayed, thereby allowing the driver to drive a vehicle while confirming the safety.

When the image monitoring apparatus is out of order, the driver should confirm the dead angle by using an auxiliary device such as back mirrors. However, sensing of a failure of an image monitoring apparatus may occasionally be difficult. For example, if an image displayed on a display freezes, that is, if an image stops during display of moving image in real time, a peripheral image itself is being displayed on the display, thus it is difficult to sense a failure.

Therefore, it has been proposed that whether a vehicle is operated or not is detected based on the number of rotations of tires and the speed of a speed meter, and if the vehicle is operated, whether the image monitoring apparatus is out of order or not is determined based on a comparison with an image acquired at a different point in time (see Patent Literature 1).

CITATION LIST

Patent Literature 1: JP2011188134A

SUMMARY

Technical Problem

However, with the image monitoring apparatus described in Patent Literature 1, it is required to acquire the number of rotations of tire and the speed from external devices. Therefore, it was not possible to determine a failure of the image monitoring apparatus alone.

Therefore, the object of the present invention conceived in light of the above circumstances is to provide an image monitoring apparatus that determines a failure alone without acquiring the information from external devices, a movable object, a program and a failure determining method.

Solution to Problem

In order to solve the above-mentioned problem, an image monitoring apparatus according to a first aspect includes:

an image acquiring unit that continuously acquires a peripheral image and superimposes a periodically changing signal on a predetermined position of the peripheral image;

an image processing unit that treats the peripheral image superimposed with the signal with a predetermined image processing; and a determining unit that determines a failure of the image processing unit based on a presence or absence of a periodic change in the superimposed signal on the peripheral image treated with the predetermined image processing.

Furthermore, an image monitoring apparatus according to a second aspect includes:

an image acquiring unit that continuously acquires a peripheral image and superimposes a periodically changing signal on a predetermined position of the peripheral image; and a determining unit that determines a failure of the image acquiring unit based on a presence or absence of a periodic change in the superimposed signal on the peripheral image superimposed with the signal.

Moreover, in an image monitoring apparatus according to a third aspect, it is preferred that the periodic change in the signal is at least one of a presence or absence of addition of a signal, color, luminance and shape.

In addition, in an image monitoring apparatus according to a fourth aspect, it is preferred that the image monitoring apparatus further includes a warning unit that warns that, when the determining unit determines a failure, the image monitoring apparatus is in a failed state.

Furthermore, in an image monitoring apparatus according to a fifth aspect, it is preferred that the warning unit warns by displaying an image indicating a failed state".

Moreover, an image monitoring apparatus according to a sixth aspect includes:

an image acquiring unit that continuously acquires a peripheral image and superimposes a periodically changing signal on a predetermined position of an image signal corresponding to the peripheral image;

an image processing unit that treats the image signal superimposed with the signal with a predetermined image processing; and a determining unit that determines a failure of the image processing unit based on a presence or absence of a periodic change in the superimposed signal on the image signal treated with the predetermined image processing.

An image monitoring apparatus according to a seventh aspect includes:

an image acquiring unit that continuously acquires a peripheral image and superimposes a periodically changing signal on a predetermined position of an image signal corresponding to the peripheral image; and a determining unit that determines a failure of the image acquiring unit based on a presence of absence of a periodic change in the superimposed signal on the image signal superimposed with the signal.

A movable object according to an eighth aspect includes:

an image acquiring unit that continuously acquires a peripheral image and superimposes a periodically changing signal on a predetermined position of the peripheral image;

an image processing unit that treats the peripheral image superimposed with the signal with a predetermined image processing; and a determining unit that determines a failure of the image processing unit based on a presence or absence of a periodic change in the superimposed signal on the peripheral image treated with the predetermined image processing.

Although the solution to problem of the present invention has been explained as a device as mentioned above, it should be appreciated that the present invention can be realized also as a method, a program and a storage medium that stores a program corresponding to the device, and they are also included in the scope of the present invention.

For example, a program according to a ninth aspect of the present invention causes an image monitoring apparatus to serve as:

an image acquiring unit that continuously acquires a peripheral image and superimposes a periodically changing signal on a predetermined position of the peripheral image;

an image processing unit that treats the peripheral image superimposed with the signal with a predetermined image processing; and a determining unit that determines a failure of the image processing unit based on a presence or absence of a periodic change in the superimposed signal on the peripheral image treated with the predetermined image processing.

Furthermore, a failure determining method according to a tenth aspect of the present invention includes:

a first acquiring step of continuously acquiring a peripheral image;

a superimposing step of superimposing a periodically changing signal on a predetermined position of the peripheral image;

an image processing step of treating the peripheral image superimposed with the signal with a predetermined image processing; and a determining step for determining a failure of the predetermined image processing based on a presence or absence of a periodic change in the superimposed signal on the peripheral image treated with the predetermined image processing.

Effect of the Invention

According to the image monitoring apparatus, the movable object, the program and the failure determining method configured as mentioned above, a failure can be determined alone without acquiring the information from outside.

BRIEF DESCRIPTION OF DRAWINGS

FIG. 5 is a flow chart illustrating a failure determination processing executed by a controller in a second embodiment.

DESCRIPTION OF EMBODIMENTS

Embodiments of the present invention will now be described below with reference to the drawings.

Figure 1:
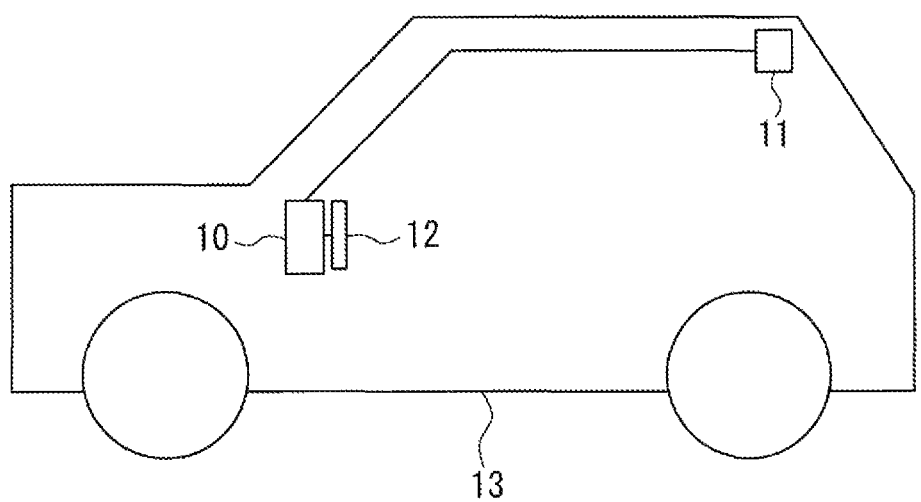
FIG. 1 is a drawing of an image monitoring apparatus, arranged in a vehicle, according to a first embodiment of the present invention.

First, an image monitoring apparatus according to a first embodiment of the present invention is described. FIG. 1 is a drawing of an image monitoring apparatus, arranged in a vehicle, according to a first embodiment of the present invention.

As illustrated in FIG. 1, the image monitoring apparatus 10 is provided, along with an imaging unit 11 and a display 12, in a vehicle 13. The image monitoring apparatus 10 may be provided anywhere in the vehicle 13, and in this embodiment, it is provided near a driver's seat. The imaging unit 11 may also be provided anywhere in the vehicle 13, and in this embodiment, in order to take a peripheral image of the field of view described later, it is fixed to the back of the vehicle 13. The display 12 is provided so that it can be viewed from a driver's seat.

Figure 2:
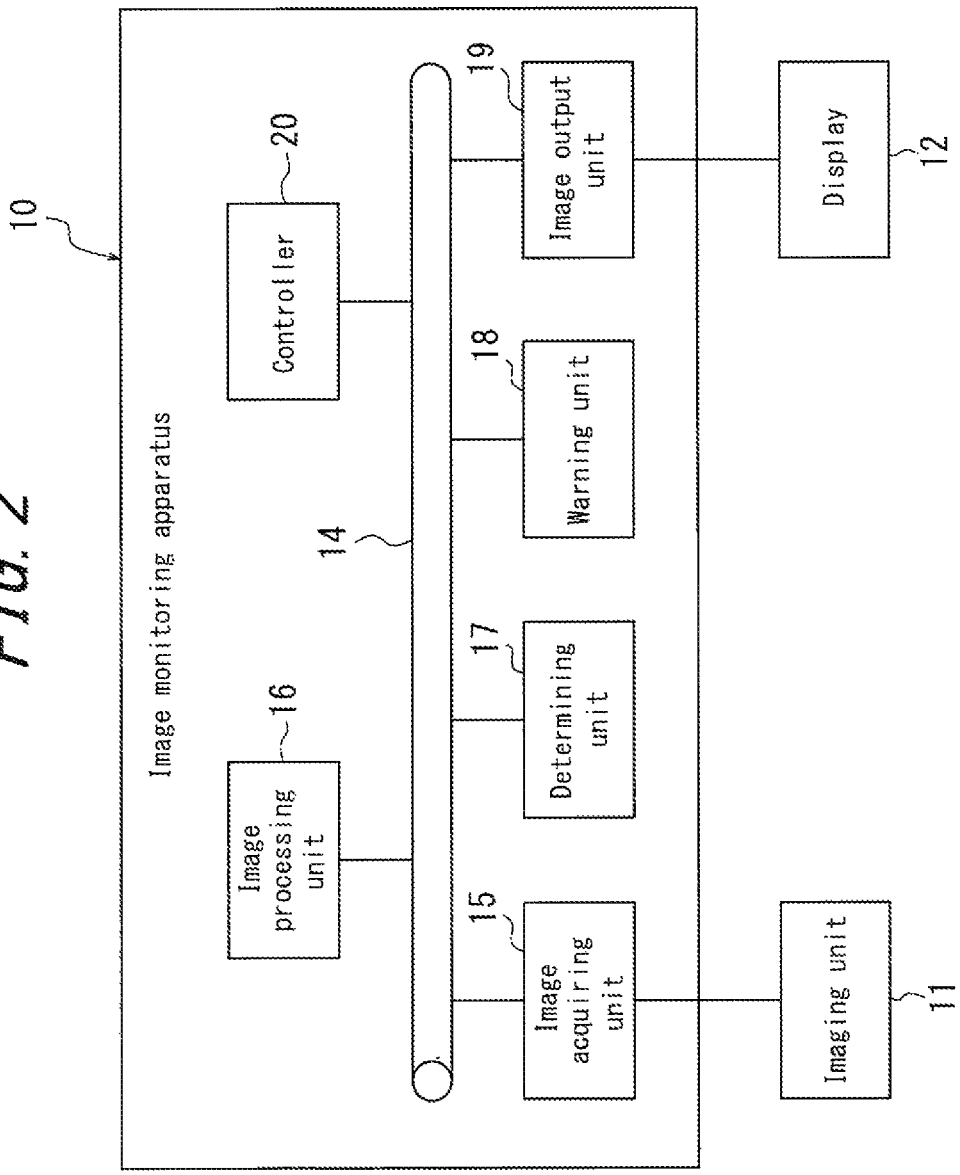
FIG. 2 is a function block diagram illustrating a schematic configuration of the image monitoring apparatus in FIG. 1.

As illustrated in FIG. 2, the image monitoring apparatus 10 is configured by including a bus 14, an image acquiring unit 15, an image processing unit 16, a determining unit 17, a warning unit 18, an image output unit 19 and a controller 20.

The bus 14 connects the image acquiring unit 15, the image processing unit 16, the determining unit 17, the warning unit 18, the image output unit 19 and the controller 20 and transmits data and a command.

The image acquiring unit 15 acquires a peripheral image from the imaging unit 11. In addition, the image acquiring unit 15 transmits a command to drive the imaging unit 11 to the imaging unit 11. The imaging unit 11 has a camera. The camera is fixed to the back of the vehicle 13 so that it can take a peripheral image in a specific visual field behind the vehicle 13. The camera is an electronic camera having an image sensor, and with the image sensor, an image signal corresponding to the peripheral image is continuously generated at a predetermined frame rate, for example, 1/30 fps.

In addition, the image acquiring unit 15 superimposes a periodically changing signal on a predetermined position of the peripheral image. For example, the image acquiring unit 15 draws a dot whose color alternately switches between "white" and "black" for each frame on a position that is unnoticeable to the driver, such as corners of the peripheral image. That is, the image acquiring unit 15 superimposes a signal corresponding to the white dot and a signal corresponding to the black dot on the peripheral image.

The image processing unit 16 treats the peripheral image acquired by the image acquiring unit 15 with a predetermined image processing. The predetermined image processing includes, for example, a white balance processing, an interpolation processing, a gamma correction processing, a superimposition processing of additional information such as a marker indicating a passage region of vehicle, or the like.

The determining unit 17 determines whether or not the signal superimposed on the peripheral image treated with the predetermined image processing by the image processing unit 16 has changed from the signal superimposed on the peripheral image of the previous frame. The determining unit 17 determines, when there is no change in the superimposed signal, that at least one of the image acquiring unit 15 and the image processing unit 16 is out of order.

When the determining unit 17 determines that at least one of the image acquiring unit 15 and the image processing unit 16 is out of order, the warning unit 18 superimposes a warning indicating a failed state on the peripheral image treated with the predetermined image processing by the image processing unit 16.

The image output unit 19 outputs a peripheral image treated with the predetermined image processing by the image processing unit 16 or the peripheral image superimposed with the warning by the warning unit 18 to the display 12.

The controller 20 controls each unit constituting the image monitoring apparatus 10. For example, when the input unit of the image monitoring apparatus 10 detects an input for executing an image observation by the user, the controller 20 causes the imaging unit 11 to taking a peripheral image and the display 12 to display it. In addition, as described later, the controller 20 controls each unit to determine a failure of the image monitoring apparatus 10.

Figure 3:
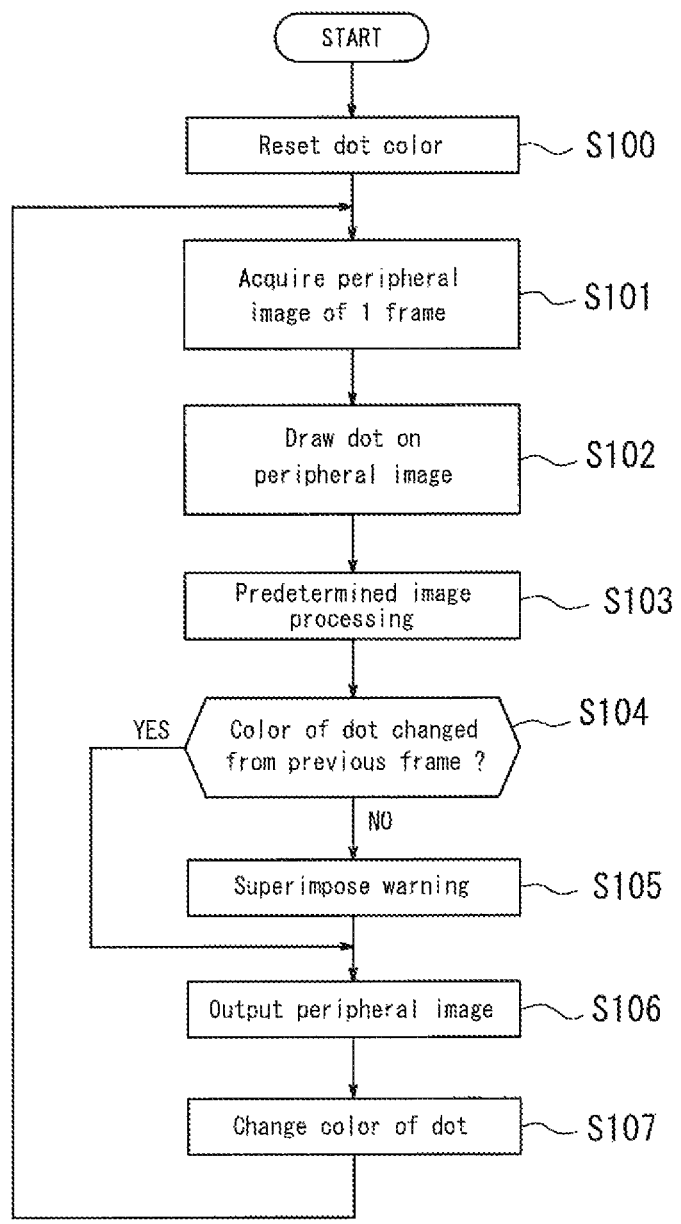
FIG. 3 is a flow chart illustrating a failure determination processing executed by a controller in the first embodiment.

Next, a failure determination processing executed by the controller 20 in the first embodiment is described using the flow chart in FIG. 3. The controller 20 starts the failure determination processing when detecting an input for executing an image observation. The failure determination processing is finished when an input for finishing the image observation is detected.

In step S100, the controller 20 resets the color of dot drawn on the peripheral image to black, for example. Note that, the color at the time of reset may be white. After the reset of the color of dot, the process proceeds to step S101.

In step S101, the controller 20 causes the image acquiring unit 15 to acquire a peripheral image of one frame. When the peripheral image is acquired, the process proceeds to step S102.

In step S102, the controller 20 causes the image acquiring unit 15 to draw a dot whose color is determined in step S100 or step S107 on a predetermined position of the peripheral image. When the dot is drawn on the peripheral image, the process proceeds to step S103.

In step S103, the controller 20 causes the image processing unit 16 to treat the peripheral image on which the dot is drawn in step S102 with an image processing. After the image processing, the process proceeds to step S104.

In step S104, the controller 20 causes the determining unit 17 to determine if there is change, between the previous frame and the current frame, in the color of dot on the peripheral image treated with the predetermined image processing in step S103. If there is no change in the color of dot, it is determined that at least one of the image acquiring unit 15 and the image processing unit 16 is out of order, and the process proceeds to step S105. If there is a change in the color of dot, it is determined that the image processing unit 16 is normal, and the process skips step S105 and proceeds to step S106.

In step S105, the controller 20 causes the warning unit 18 to superimpose a warning on the peripheral image treated with the predetermined image processing in step S103. After a warning is superimposed, the process proceeds to step S106.

In step S106, the controller 20 causes the image output unit 19 to output the peripheral image treated with the predetermined image processing in step S103 or the peripheral image superimposed with the warning in step S105 to the display 12. After output of the peripheral image, the process proceeds to step S107.

In step S107, the controller 20 changes the color of dot to be drawn on the peripheral image from the current color. When the color of dot is black, it is changed to white, and when it is white, it is changed to black. After change of the color of dot, the process returns to step S101.

According to the image monitoring apparatus of the first embodiment configured in the above mentioned manner, a periodically changing signal is superimposed on a peripheral image to be acquired, and after a predetermined image processing, a periodic change in the superimposed signal is monitored, thereby allowing to determine a failure of at least one of the image acquiring unit 15 and the image processing unit 16. According to such configuration, the information from external device is not needed, and a failure can be determined by the image monitoring apparatus alone.

Next, the second embodiment of the present invention is explained. In the second embodiment, a position superimposed with a periodically changing signal is different from that in the first embodiment. The second embodiment will be described below focusing on the points that are different from the first embodiment. Note that the same reference signs are assigned to the sections that have the same configuration as those of the first embodiment.

As with the first embodiment, the image monitoring apparatus 10 of the second embodiment is configured by including a bus 14, an image acquiring unit 15, an image processing unit 16, a determining unit 17, a warning unit 18, an image output unit 19 and a controller 20. In the second embodiment, the function and configuration of the bus 14, the image processing unit 16, the warning unit 18, the image output unit 19 and the controller 20 are the same as those of the first embodiment.

As with the first embodiment, the image acquiring unit 15 of the second embodiment acquires a peripheral image from the imaging unit 11. In addition, the image acquiring unit 15 transmits a command to drive the imaging unit 11 to the imaging unit 11.

Figure 4:
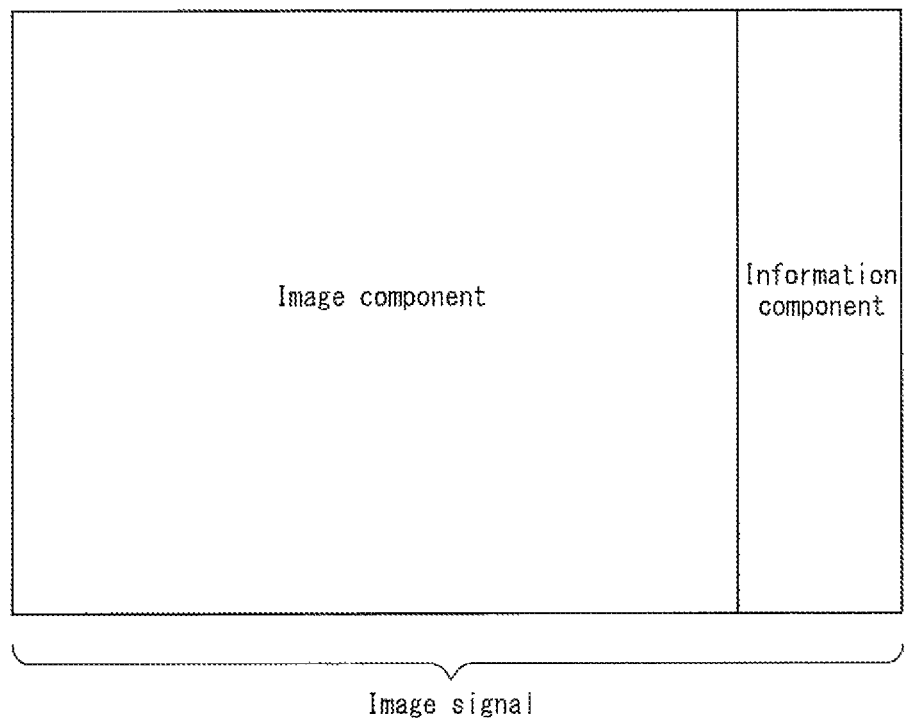
FIG. 4 is a diagram illustrating a data configuration of an image signal.

On the other hand, unlike the first embodiment, the image acquiring unit 15 of the second embodiment superimposes a periodically changing signal on a predetermined position of an image signal corresponding to the acquired peripheral image. As illustrated in FIG. 4, the image signal has an image component and an information component. The image component is a signal component corresponding to each pixel constituting an image sensor including an optical black. The information component is a signal component indicating the information relating to the image component of the same frame, such as the date of generation, the imaging mode, or the like. The information component is added to the image component generated by the image sensor by the imaging unit 11 or the image acquiring unit 15. The predetermined position of an image signal superimposed with a periodically changing signal may be either the image component or the information component. However, it is preferably any position of the information component. In addition, when a signal is superimposed on the image component, it is preferred that the signal be superimposed on a position corresponding to an optical black. In the second embodiment, the periodically changing signal is, for example, frame Nos. (1 to 30) according to the NTSC system or numbers (0 to 255) that can be represented when the image acquiring unit 15 is 8 bit, for example.

The determining unit 17 determines whether or not the signal superimposed on the image signal treated with the predetermined image processing by the image processing unit 16 has changed from the signal superimposed on the image signal of the previous frame. The determining unit 17 determines, when there is no change in the superimposed signal, that at least one of the image acquiring unit 15 and the image processing unit 16 is out of order.

Next, the failure determination processing executed by the controller 20 in the second embodiment is described with the flow chart in FIG. 5. The controller 20 starts the failure determination processing when detecting an input for executing an image observation. The failure determination processing is finished when an input for finishing the image observation is detected.

In step S200, the controller 20 resets the signal value of the periodically changing signal to zero, for example. After the reset, the process proceeds to step S201.

In step S201, the controller 20 causes the image acquiring unit 15 to acquire a peripheral image of one frame. After acquisition of the peripheral image, the process proceeds to step S202.

In step S202, the controller 20 causes the image acquiring unit 15 to superimpose a periodically changing signal on a predetermined position of the image signal. After superimposition of the periodically changing signal, the process proceeds to step S203.

In step S203, the controller 20 causes the image processing unit 16 to treat the image signal superimposed with the periodically changing signal in step S202 with an image processing. After the image processing, the process proceeds to step S204.

In step S204, the controller 20 causes the determining unit 17 to determine if there is a change, between the previous frame and the current frame, in the signal value of the signal superimposed on the image signal treated with the predetermined image processing in step S203. If there is no change in the signal value, it is determined that at least one of the image acquiring unit 15 and the image processing unit 16 is out of order, and the process proceeds to step S205. If there is a change in the signal value, it is determined that the image processing unit 16 is normal, and the process skips step S205 and proceeds to step S206.

In step S205, the controller 20 causes the warning unit 18 to superimpose a warning on the image signal treated with the predetermined image processing in step S203. After superimposition of the warning, the process proceeds to step S206.

In step S206, the controller 20 causes the image output unit 19 to output the image signal treated with the predetermined image processing in step S203 or the image signal superimposed with the warning in step S205 to the display 12. After output of the image signal, the process proceeds to step S207.

In step S207, the controller 20 determines whether or not the periodically changing signal value is an upper limit value. The upper limit value is 30, for example, when the frame number of NTSC system is used as a periodically changing signal value, and is 225 when the number that can be represented in 8 bit is used as a periodically changing signal value. When the periodically changing signal value is the upper limit value, the process returns to step S200. When the periodically changing signal value is not the upper limit value, the process proceeds to step S208.

In step S208, the controller 20 adds 1 to the periodically changing signal value. After addition of 1 to the signal value, the process returns to step S201.

The image monitoring apparatus of the second embodiment configured in the above mentioned manner can also determine a failure of at least one of the image acquiring unit 15 and the image processing unit 16. Such configuration also needs no information from the external devices, and the image monitoring apparatus can determine a failure alone.

Although the present invention has been described based on various drawings and embodiments, it should be noted for a person skilled in the art that various changes and modifications can be made easily based on this disclosure. Therefore, it should be noted that such changes and modifications are included in the scope of the present invention.

For example, in the first embodiment, although the image monitoring apparatus 10 is configured to periodically change a signal for superimposition so that a dot whose color switches between "white" and "black" for each frame is drawn on a predetermined position of a peripheral image, the image monitoring apparatus 10 is not limited to such configuration. For example, it may be configured to switch between "signal added" and "no signal added" for each frame, to switch a color for each frame, to switch the shape of drawing to the peripheral image or the image signal for each frame, to update the number of frame from 1 to 30 for each frame, or to count the numbers that can be represented by the image acquiring unit 15 for each frame. Furthermore, in the second embodiment, as in the case of the value that increases for each frame, the image monitoring apparatus 10 is configured to periodically change a signal superimposed on an image signal. However, the image monitoring apparatus 10 is not limited to such a configuration. For example, it may be configured so that signal values are 255 and 0 that correspond respectively to white and black.

In addition, in the first embodiment and the second embodiment, although the image monitoring apparatus 10 is configured to give a warning to the user by superimposing a warning on an peripheral image when it is determined that at least one of the image acquiring unit 15 and the image processing unit 16 is out of order, it is not limited to such a configuration. For example, it may be configured to display an image indicating that at least one of the image acquiring unit 15 and the image processing unit 16 is out of order itself on the display 12, or to warn the user of a failure by giving an alarm sound. Moreover, it may be configured to give a warning of failure by appealing to a tactile sense of the user.

In addition, in the first embodiment and the second embodiment, although the image monitoring apparatus 10 is configured to output an image superimposed with a warning to the display 12 when determining that at least one of the image acquiring unit 15 and the image processing unit 16 is out of order, the operation thereof after determination is not limited to the output of an image superimposed with a warning. For example, the failure information may be output to ECU (Electronic Control Unit) on the movable object 13 side. Furthermore, the image monitoring apparatus 10 may be stopped automatically. In addition, an image indicating a failure may be output to the display 12, or the like. Moreover, the mode may be shifted into a standby mode, that is, an output stop mode.

Furthermore, in the first embodiment and the second embodiment, although the image monitoring apparatus 10 is configured to connect with the imaging unit 11 and the display 12, it may be integrated with at least one of them.

In addition, in the first embodiment and the second embodiment, although the image monitoring apparatus 10 is configured to install on a movable object such as a vehicle, installation site of the image monitoring apparatus 10 is not limited to vehicles and movable objects.

Moreover, in the first embodiment, although the image monitoring apparatus 10 is configured to change the color of dot for each frame, it is not limited to each frame, and a signal corresponding to the color of dot may be switched periodically.

REFERENCE SIGNS LIST

10 Image monitoring apparatus
11 Imaging unit
12 Display
13 Vehicle
14 Bus
15 Image acquiring unit
16 Image processing unit
17 Determining unit
18 Warning unit
19 Image output unit 20 Controller

The invention claimed is:

1. An image monitoring apparatus, comprising:
a processor and a memory communicatively coupled with the processor, the processor being configured to:
continuously acquire a peripheral image from an imaging unit and thereafter replace an image data on a predetermined position of an image signal with a periodically changing signal such that there is a change between a previous frame and a current frame, the imaging unit including an optical black, the image signal having an optical black component being a signal component corresponding to each pixel of the optical black of the imaging unit and an image component being a signal component corresponding to each pixel of the imaging unit other than the optical black;
treat the image signal in which the image data on the predetermined position is replaced with the signal with a predetermined image processing;
determine a failure of the predetermined image processing if there is no periodic change between the current frame and the previous frame in the replaced signal on the image signal treated with the predetermined image processing; and
when the failure is determined, warn that the image monitoring apparatus is in a failed state, wherein
the predetermined position is a position within the optical black component.

2. The image monitoring apparatus according to claim 1, wherein a periodic change in the signal is at least one of a presence or absence of addition of a signal, color, luminance and shape.

3. The image monitoring apparatus according to claim 1, wherein the processor is configured to give a warning by displaying an image indicating the failed state.

4. An image monitoring apparatus, comprising:
a processor and a memory communicatively coupled with the processor, the processor being configured to:
continuously acquire a peripheral image from an imaging unit and thereafter replace image data on a predetermined position of an image signal with a periodically changing signal such that there is a change between a previous frame and a current frame, the imaging unit including an optical black, the image signal having an optical black component being a signal component corresponding to each pixel of the optical black of the imaging unit and an image component being a signal component corresponding to each pixel of the imaging unit other than the optical black;
determine a failure of the image acquiring if there is no periodic change between the current frame and the previous frame in the replaced signal on the image signal in which the image data on the predetermined position is replaced with the signal; and
when the failure is determined, warn that the image monitoring apparatus is in a failed state, wherein
the predetermined position is a position within the optical black component.

5. A non-transitory computer readable storage medium storing program that causes an image monitoring apparatus having a processor and a memory communicatively coupled with the processor to:
continuously acquire a peripheral image from an imaging unit and thereafter replace image data on a predetermined position of an image signal with a periodically changing signal such that there is a change between a previous frame and a current frame, the imaging unit including an optical black, the image signal having an optical black component being a signal component corresponding to each pixel of the optical black of the imaging unit and an image component being a signal component corresponding to each pixel of the imaging unit other than the optical black;
treat the peripheral image in which the image data on the predetermined position is replaced with the signal with a predetermined image processing;
determine a failure of the predetermined image processing if there is no periodic change between the current frame and the previous frame in the replaced signal on the peripheral image treated with the predetermined image processing; and
when the failure is determined, warn that the image monitoring apparatus is in a failed state, wherein
the predetermined position is a position within the optical black component.

6. A failure determining method implemented by a processor communicatively coupled with a memory, comprising:
a first acquiring step of acquiring, by the processor, a peripheral image continuously from an imaging unit;
a step of, after the first acquiring step, replacing, by the processor, image data on a predetermined position of an image signal with a periodically changing signal such that there is a change between a previous frame and a current frame, the imaging unit including an optical black, the image signal having an optical black component being a signal component corresponding to each pixel of the optical black of the imaging unit and an image component being a signal component corresponding to each pixel of the imaging unit other than the optical black;
an image processing step of treating, by the processor, the peripheral image in which the image data on the predetermined position is replaced with the signal with a predetermined image processing;
a determining step of determining, by the processor, a failure of the predetermined image processing if there is no periodic change between the current frame and the previous frame in the replaced signal on the peripheral image treated with the predetermined image processing; and
a step of giving a warning of failure when the failure is determined, wherein
the predetermined position is a position within the optical black component.

7. The image monitoring apparatus according to claim 4, wherein a periodic change in the signal is at least one of a presence or absence of addition of a signal, color, luminance and shape.

8. A movable object comprising the image monitoring apparatus according to claim 2.

9. A movable object comprising the image monitoring apparatus according to claim 3.

10. A movable object comprising the image monitoring apparatus according to claim 1.

11. A movable object comprising the image monitoring apparatus according to claim 4.

12. A movable object comprising the image monitoring apparatus according to claim 7.

13. The image monitoring apparatus according to claim 1, wherein the image monitoring apparatus is provided on a movable object, and the processor is configured to determine the failure of the predetermined image processing not based on information from the movable object.

14. The image monitoring apparatus according to claim 4, wherein the image monitoring apparatus is provided on a movable object, and the processor is configured to determine the failure of the image acquiring not based on information from the movable object.

15. The image monitoring apparatus according to claim 1, wherein the periodic change between the current frame and the previous frame in the replaced signal is provided by a periodical change between presence of a signal and absence of the signal.

16. The image monitoring apparatus according to claim 1, wherein the processor is configured to determine if there is a change, between the previous frame and the current frame, in a signal value of the periodically changing signal; and determine the failure of the predetermined image processing if the processor determines that there is no change between the current frame and the previous frame in the signal value of the periodically changing signal.

17. The image monitoring apparatus according to claim 1, wherein the processor is configured to output information of the failure of the predetermined image processing to Electronic Control Unit on a movable object when the processor determines the failure of the predetermined image processing.

* * * * *